(12) United States Patent
Qin et al.

(10) Patent No.: US 12,152,621 B2
(45) Date of Patent: Nov. 26, 2024

(54) SAFETY PIN LOCKING DEVICE FOR WORKPIECE TURNOVER AND WORKPIECE TURNOVER SYSTEM

(71) Applicant: XUZHOU XCMG MINING MACHINERY CO., LTD., Xuzhou (CN)

(72) Inventors: Hongyi Qin, Xuzhou (CN); Jieshan Zhang, Xuzhou (CN); Zhou Wang, Xuzhou (CN); Xijiang Yao, Xuzhou (CN); Kuipu Qiao, Xuzhou (CN); Zhuo Chen, Xuzhou (CN); Zhiming Tang, Xuzhou (CN); Ning Du, Xuzhou (CN); Ming Zhao, Xuzhou (CN)

(73) Assignee: XUZHOU XCMG MINING MACHINERY CO., LTD., Xuzhou (CN)

( * ) Notice: Subject to any disclaimer, the term of this patent is extended or adjusted under 35 U.S.C. 154(b) by 0 days.

(21) Appl. No.: 18/575,336

(22) PCT Filed: Nov. 19, 2021

(86) PCT No.: PCT/CN2021/131589
§ 371 (c)(1),
(2) Date: Dec. 29, 2023

(87) PCT Pub. No.: WO2023/279626
PCT Pub. Date: Jan. 12, 2023

(65) Prior Publication Data
US 2024/0263661 A1  Aug. 8, 2024

(30) Foreign Application Priority Data

Jul. 6, 2021 (CN) .................. 202110760727.X

(51) Int. Cl.
F16B 21/10 (2006.01)
B62D 33/07 (2006.01)
(Continued)

(52) U.S. Cl.
CPC .......... F16B 21/125 (2013.01); B62D 33/071 (2013.01); F16B 2/18 (2013.01); F16B 21/10 (2013.01); F16B 2200/69 (2023.08)

(58) Field of Classification Search
CPC ....... B60P 1/283; B62D 33/07; B62D 33/071; F16B 21/10; F16B 2200/69; F16B 2/18; Y10T 403/32893
See application file for complete search history.

(56) References Cited

U.S. PATENT DOCUMENTS 3,667,259 A * 6/1972 Reque ................... E05B 67/383
                                                          292/288
4,053,178 A * 10/1977 York ....................... B62D 33/07
                                                          296/35.1
(Continued)

FOREIGN PATENT DOCUMENTS

CN    202115602 U    1/2012
CN    103600783 A    2/2014
(Continued)

Primary Examiner — Michael P Ferguson
(74) Attorney, Agent, or Firm — Bayramoglu Law Offices LLC

(57) ABSTRACT

A safety pin locking device for workpiece turnover includes a safety pin, a triangular lock plate, an elastic positioning pin, and a lockset. The safety pin is configured to be inserted into a base and an overturnable workpiece to lock an angle of the overturnable workpiece relative to the base. A first corner end of the triangular lock plate is connected to an axial surface of the safety pin by a fastener, and the triangular lock plate can rotate around the fastener. The elastic positioning pin is mounted at a second corner end of the triangular lock plate and is configured to be inserted into (Continued)

positioning counterbores at two different positions on the axial surface of the safety pin to limit a position of the triangular lock plate. The lockset is mounted at a third corner end of the triangular lock plate.

16 Claims, 8 Drawing Sheets

(51) Int. Cl.
*F16B 2/18* (2006.01)
*F16B 21/12* (2006.01)

(56) References Cited

U.S. PATENT DOCUMENTS

| | | | | | |
|---|---|---|---|---|---|
| 4,085,599 | A | * | 4/1978 | Fischer | E05B 67/383 |
| | | | | | 70/14 |
| 4,508,479 | A | * | 4/1985 | Mez | F16B 2/14 |
| | | | | | 411/355 |
| 4,822,197 | A | * | 4/1989 | DeMartino | F16C 11/045 |
| | | | | | 411/340 |
| 5,597,260 | A | * | 1/1997 | Peterson | F16B 21/04 |
| | | | | | 403/348 |
| 5,881,582 | A | * | 3/1999 | Monaco | E05B 67/383 |
| | | | | | 70/30 |
| 6,299,223 | B1 | * | 10/2001 | Ji | E05C 5/02 |
| | | | | | 292/175 |
| 7,338,114 | B2 | * | 3/2008 | Ishii | B62D 33/07 |
| | | | | | 180/89.18 |
| 7,959,218 | B2 | * | 6/2011 | Endou | B62D 33/07 |
| | | | | | 296/190.04 |
| 8,544,939 | B2 | * | 10/2013 | Klein | B62D 33/071 |
| | | | | | 296/190.07 |
| 9,458,766 | B2 | * | 10/2016 | Foster | F16B 21/10 |
| 9,702,122 | B2 | * | 7/2017 | Hurley | E02F 9/2833 |

FOREIGN PATENT DOCUMENTS

| | | |
|---|---|---|
| CN | 210879476 U | 6/2020 |
| CN | 113357243 A | 9/2021 |
| DE | 102007004357 A1 | 8/2008 |
| JP | H08145034 A | 6/1996 |

* cited by examiner

SAFETY PIN LOCKING DEVICE FOR WORKPIECE TURNOVER AND WORKPIECE TURNOVER SYSTEM

CROSS REFERENCE TO THE RELATED APPLICATIONS

This application is the national phase entry of International Application No. PCT/CN2021/131589, filed on Nov. 19, 2021, which is based upon and claims priority to Chinese Patent Application No. 202110760727.X, filed on Jul. 6, 2021, the entire contents of which are incorporated herein by reference.

TECHNICAL FIELD

The present disclosure relates to a safety pin locking device for workpiece turnover, and to the technical field of mechanical mechanisms.

BACKGROUND

Mining dump trucks are generally large sized dump trucks with a high load capacity of 30 tons or above. During vehicle maintenance, a cargo compartment, a cab, an engine compartment, and other components need to be turned over first. To ensure safety of maintenance workers, these components need to be locked after being turned over, to prevent dropping caused by system failure or human factors and squeezing to maintenance workers below.

Currently, there are many related technologies, including supporting by a support rod, limiting by a cable, self-locking by a check valve in a hydraulic system, and other means to provide a limiting function. However, these operations are complicated, and mounting or removal needs to be performed by an external tool. In addition, when several persons perform maintenance operations at the same time, it is impossible to avoid misoperation, and safety is poor.

SUMMARY

To solve the problems existing in the prior art, the present disclosure provides a safety pin locking device for workpiece turnover, which features simple structure, convenient operation, and high safety. By designing a triangular lock plate and an elastic positioning pin structure, a safety pin can be mounted, locked or removed without using other tools, thereby greatly improving safety and convenience.

To achieve the above objective, the present disclosure provides the following technical solution:

The present disclosure discloses a safety pin locking device for workpiece turnover, including a safety pin, a triangular lock plate, an elastic positioning pin, and a lockset, where the safety pin is configured to be inserted into a base and an overturnable workpiece to lock an angle of the overturnable workpiece relative to the base; a first corner end of the triangular lock plate is connected to an axial surface of the safety pin by a fastener, and the triangular lock plate can rotate around the fastener; the elastic positioning pin is mounted at a second corner end of the triangular lock plate and is configured to be inserted into positioning counterbores at two different positions on the axial surface of the safety pin to limit a position of the triangular lock plate, so as to pull out the safety pin from the overturnable workpiece or prevent the safety pin from being pulled out; and the lockset is mounted at a third corner end of the triangular lock plate and is configured to limit rotation of the triangular lock plate, and the triangular lock plate is rotated by unlocking the lockset and pulling out the elastic positioning pin.

A specific solution is as follows: The safety pin includes a pin shaft, an axial surface of the pin shaft is provided with three holes, which are a threaded fixing hole, a positioning counterbore I, and a positioning counterbore II, lines connecting centers of the three holes form a regular triangle, and a center of the regular triangle coincides with an axis of the pin shaft; and the triangular lock plate has a regular triangular flat plate structure, the three corner ends are provided with a hinged through hole, an internal threaded mounting hole and a lock hole, respectively, and lines connecting centers of the hinged through hole, the internal threaded mounting hole and the lock hole form a regular triangle, with a hole spacing consistent with a hole spacing of the three holes in the safety pin.

A specific solution is as follows: The fastener is a fixing bolt; the fastener is a fixing bolt; a rotating sleeve with a T-shaped structure is mounted in the hinged through hole, and the fixing bolt passes through the rotating sleeve and then is screwed into the threaded fixing hole; and after the rotating sleeve is pressed by the fixing bolt, a gap is reserved between an end surface of the triangular lock plate and a T-shaped stepped end surface of the rotating sleeve; and after the rotating sleeve is pressed by the fixing bolt, a gap is reserved between an end surface of the triangular lock plate and a T-shaped stepped end surface of the rotating sleeve. The gap prevents the triangular lock plate from being deadly pressed and unable to rotate. The gap should be as small as possible, generally within 0.5 mm. A too large gap is likely to cause the triangular lock plate to tilt.

A specific solution is as follows: When the elastic positioning pin is mounted in the internal threaded mounting hole and then inserted into the positioning counterbore I, a geometric shape of the triangular lock plate is all within a diameter range of the safety pin, so as not to prevent the safety pin from being pulled out of or inserted into the overturnable workpiece; when the elastic positioning pin is mounted in the internal threaded mounting hole and then inserted into the positioning counterbore II, a corner of the triangular lock plate deviates from the diameter range of the safety pin, such that the safety pin is not allowed to be pulled out from the overturnable workpiece; and the lockset is mounted in the lock hole in the corner end deviated from the diameter range of the safety pin.

A preferred solution is as follows: Each of the positioning counterbore I and the positioning counterbore II has a conical structure, which facilitate insertion of the positioning pin body.

A preferred solution is as follows: The lockset is a key lock, and the key lock is hung in the lock hole of the triangular lock plate and is configured to limit rotation of the triangular lock plate.

A preferred solution is as follows: the lockset includes a multi-hole locking mechanism and a plurality of key locks; the multi-hole locking mechanism is clamped into the lock hole of the triangular lock plate and is configured to limit rotation of the triangular lock plate; and the plurality of key locks are hung in hanging holes of the multi-hole locking mechanism respectively, and the multi-hole locking mechanism is opened only after all the hung key locks are unlocked.

A preferred solution is as follows: The multi-hole locking mechanism is formed by connecting two symmetrical locking pieces together through a hinged shaft; one end of each of the locking pieces is a semi-circular locking tongue, and the semi-circular locking tongues of the two locking pieces intersect to form a locking ring; and a plurality of locking holes are distributed at the other end of the locking tongue piece, and when the multi-hole locking mechanism is in a closed state, the locking holes of the two symmetrical locking pieces coincide one to one, and the plurality of key locks are hung in the coinciding locking holes respectively.

The function of hanging the multi-hole locking mechanism is that when the overturnable workpiece is large, a lower portion thereof can allow many workers to construct simultaneously; at this time, for self safety, each construction worker can hang one key lock that belongs to the construction worker, and only the construction worker can unlock the key lock. In this way, after each construction worker finishes his/her work, the construction worker unlocks his/her own key lock. When the last construction worker finishes his/her work, the last key lock is unlocked, and the safety pin locking device is removed, such that the overturnable workpiece safely returns.

A specific solution is as follows: The elastic positioning pin includes a positioning pin housing, a positioning pin body, an end cover, and a return spring; an external stud is arranged at one end of the positioning pin housing, and is configured to be screwed into the internal threaded mounting hole in the triangular lock plate; a limiting boss is arranged on a middle portion of the positioning pin body, and the positioning pin body is inserted into the positioning pin housing; the other end of the positioning pin housing is provided with an internal screw hole for mounting the end cover; and the return spring is sleeved on the positioning pin body between the limiting boss and the end cover.

A specific solution is as follows: The elastic positioning pin further includes a pull ring, an end of the positioning pin body is provided with a pull ring hole, and the pull ring is mounted in the pull ring hole.

A process of assembling the elastic positioning pin includes the following: inserting the positioning pin body into the positioning pin housing, placing the return spring in, then screwing the end cover into the internal screw hole in the positioning pin housing, pressing the limiting boss on the positioning pin body by using one end of the return spring, pressing the other end of the return spring by the end cover, and then clamping the pull ring into the pull ring hole in the positioning pin body. When the elastic positioning pin is in a free state, one end of the positioning pin body extends out of an end surface of one end of the external stud of the positioning pin housing. When the pull ring is pulled hard, the positioning pin body can be retracted into the positioning pin housing; and when the pull ring is loosened, the positioning pin body automatically returns under the action of the return spring.

The present disclosure further discloses a workpiece turnover system, including a base, an overturnable workpiece, a hinged shaft, and the above-mentioned safety pin locking device, where the overturnable workpiece is connected to the base by the hinged shaft, and the overturnable workpiece can rotate around the hinged shaft; and an angle of the overturnable workpiece relative to the base is locked by the safety pin locking device.

It should be noted that the base may be a ground, a chassis of a vehicle, or other similar components. The overturnable workpiece may be a machine, a truss, a cargo compartment, a cab, or other overturnable components.

Based on the application of the above technical solution, compared with the prior art, the present disclosure has the following beneficial effects: The present disclosure features simple structure, convenient operation, and high safety. By designing of the triangular lock plate and the elastic positioning pin, the safety pin can be mounted, locked or removed without using other tools; and the triangular lock plate is provided with the lock hole, such that the multi-hole locking mechanism can be mounted to hang the plurality of key locks, thereby greatly improving safety.

BRIEF DESCRIPTION OF THE DRAWINGS

Accompanying drawings as a part of the present disclosure are intended to provide a further understanding of the present disclosure. The exemplary embodiments of the present disclosure and descriptions thereof are intended to be illustrative of the present disclosure, but do not constitute an undue limitation to the present disclosure. Apparently, the accompanying drawings in the following description show merely some embodiments, and those of ordinary skill in the art may still derive other accompanying drawings from these accompanying drawings without creative efforts.

In the figures.

Description of reference signs: M1. Base; M2. Overturnable workpiece; M3. Hinged shaft; M4. Safety pin locking device; 1. Safety pin; 2. Triangular lock plate; 3. Rotating sleeve; 4. Fixing bolt; 5. Elastic positioning pin; 6. Multi-hole locking mechanism; 7. Key lock; 1-1. Pin shaft; 1-2. Handle; 1-3. Threaded fixing hole; 1-4. Positioning counterbore I; 1-5. Positioning counterbore II; 2-1. Hinged through hole; 2-2. Internal threaded mounting hole; 2-3. Lock hole; 5-1. Positioning pin housing; 5-2. Positioning pin body; 5-3. End cover; 5-4. Pull ring; 5-5. Return spring; 5-1-1. External stud; 5-1-2. Internal screw hole; 5-2-1. Limiting boss; 5-2-2. Pull ring hole; 6-1. Locking piece I;

6-2. Locking piece II; 6-3. Hinged shaft; 6-4. Locking ring; 6-1-1. Semi-circular locking tongue; 6-1-2. Locking hole.

It should be noted that these accompanying drawings and written descriptions are not intended to limit the conceptual scope of the present disclosure in any way, but to explain the concept of the present disclosure to those skilled in the art by referring to specific embodiments.

DETAILED DESCRIPTION OF THE EMBODIMENTS

To make the objectives, technical solutions, and advantages of the embodiments of the present disclosure clearer, the technical solutions in the embodiments are clearly and completely described below with reference to the accompanying drawings in the embodiments of the present disclosure. The following embodiments are intended to illustrate the present disclosure, but are not intended to limit the scope of the present disclosure.

In descriptions of the present disclosure, it should be understood that, orientation or positional relationships indicated by terms "upper", "lower", "front", "rear", "left", "right", "vertical", "inner", "outer", and the like are orientation or positional relationships based on the accompanying drawings, and are merely intended to facilitate the descriptions of the present disclosure and simplify the descriptions, rather than indicating or implying that a device or element referred to must have a particular orientation or be constructed or operated in a particular orientation. Therefore, these terms cannot be construed as limiting the present disclosure.

In the description of the present disclosure, it should be noted that, unless otherwise clearly specified and limited, meanings of terms "mount", "connected", and "connection" should be understood in a broad sense. For example, the term may be a fixed connection, a removable connection, or an integral connection; may be a mechanical connection or an electrical connection; and may be a direct connection or an indirect connection by an intermediate medium. Those of ordinary skill in the art may understand specific meanings of the foregoing terms in the present disclosure based on a specific situation.

Figure 1:
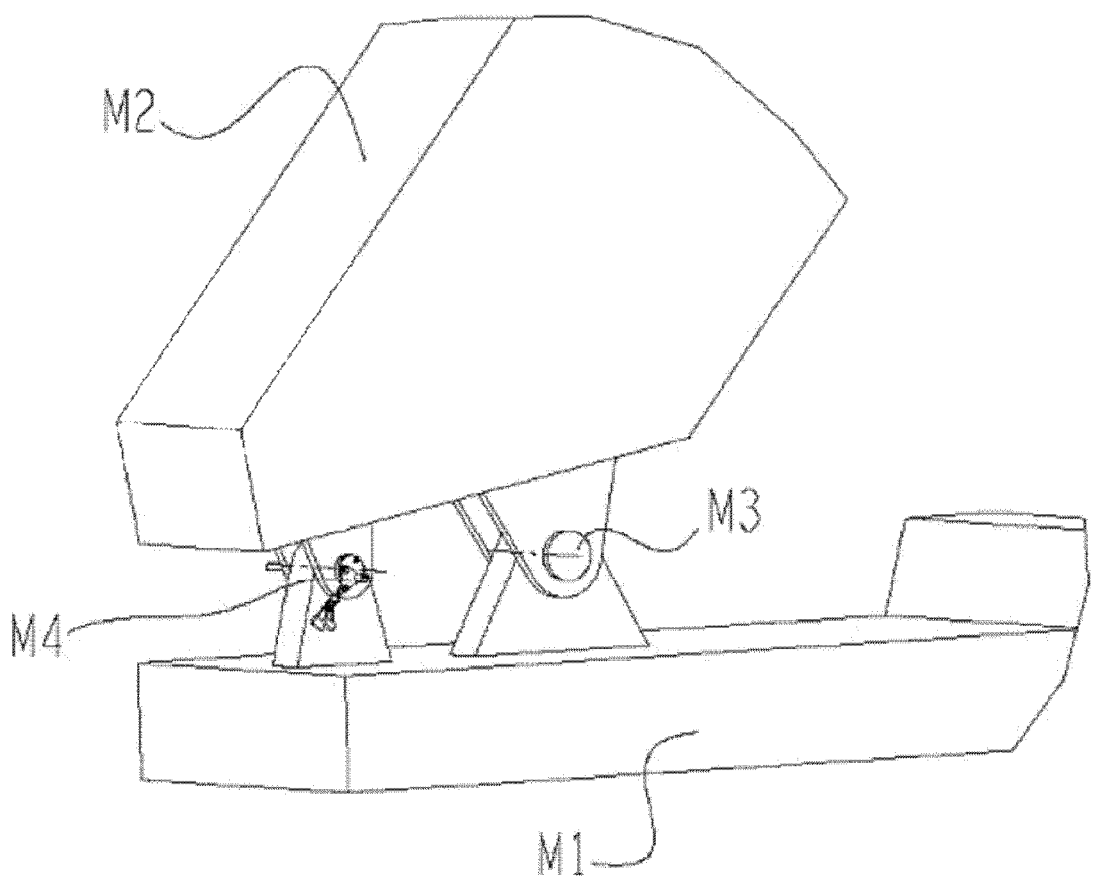
FIG. 1 is a schematic diagram of a workpiece turnover system according to the present disclosure.

As shown in FIG. 1, a workpiece turnover system includes base M1, overturnable workpiece M2, hinged shaft M3, and safety pin locking device M4, where the base M1 is a basic member, which is stationary or has a small motion amplitude relative to M2, and the overturnable workpiece M2 is connected to the base M1 by the hinged shaft M3, and can rotate around the hinged shaft M3. The overturnable workpiece M2 rotates around the hinged shaft M3, which can be operated by manpower, a lifting oil cylinder or a crane. The base M1 may be a ground, a chassis of a vehicle, or other similar components. The overturnable workpiece M2 may be a machine, a truss, a cargo compartment, a cab, or other overturnable components. The overturnable workpiece M2 sometimes needs to be locked, to facilitate maintenance or mounting of a lower portion thereof and ensures safety of workers. An angle of the overturnable workpiece M2 relative to the base M1 is locked by the safety pin locking device M4.

A preferred embodiment of the safety pin locking device in the above embodiments is given below.

Figure 2:
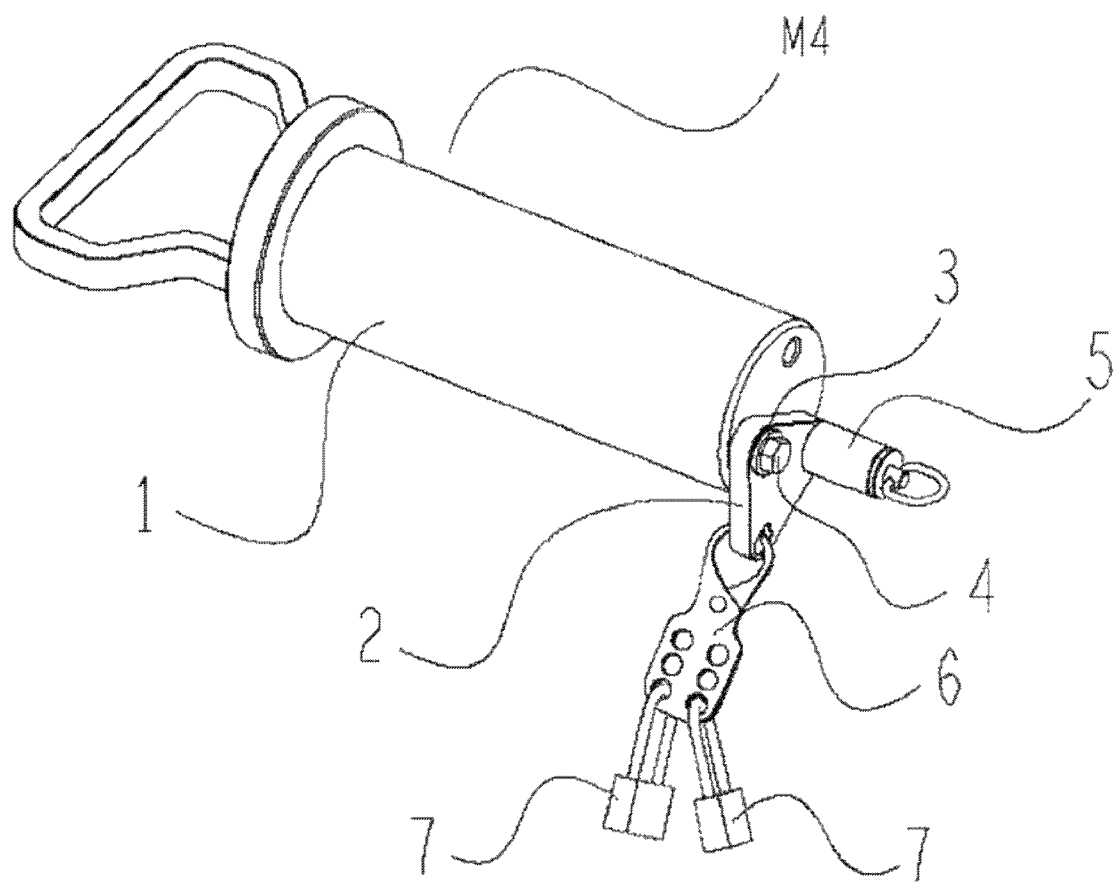
FIG. 2 is a schematic diagram of a safety pin locking device according to the present disclosure.

As shown in FIG. 2, a safety pin locking device for workpiece turnover includes safety pin 1, triangular lock plate 2, rotating sleeve 3, fixing bolt 4, elastic positioning pin 5, multi-hole locking mechanism 6, and several key locks 7.

A specific connection method is as follows: The triangular lock plate 2 is fixed to the safety pin 1 by the rotating sleeve 3 and the fixing bolt 4, and the triangular lock plate 2 can rotate around the rotating sleeve 3. The elastic positioning pin 5 is mounted in an internal threaded mounting hole 2-2 in the triangular lock plate 2, and fits with positioning counterbore I 1-4 or positioning counterbore II 1-5 in an end surface of the safety pin 1 to provide a positioning function. The multi-hole locking mechanism 6 is clamped into lock hole 2-3 of the triangular lock plate 2 to limit rotation of the triangular lock plate 2. A plurality of key locks 7 may be hung based on a number of holes in the multi-hole locking mechanism 6, and only when all the hung key locks 7 are unlocked can the multi-hole locking mechanism 6 be opened. Certainly, the key locks 7 may be directly hung in the lock hole 2-3 without using the multi-hole locking mechanism 6. In this case, only one key lock 7 can be hung.

It should be noted that the function of hanging the multi-hole locking mechanism 6 is that when the overturnable workpiece M2 is large, a lower portion thereof can allow many workers to construct simultaneously; at this time, for self safety, each construction worker can hang one key lock 7 that belongs to the construction worker, and only the construction worker can unlock the key lock. In this way, after each construction worker finishes his/her work, the construction worker unlocks his/her own key lock 7. When the last construction worker finishes his/her work, the last key lock 7 is unlocked, and the safety pin locking device M4 is removed, such that the overturnable workpiece M2 safely returns. If only one key lock 7 is hung, the key lock may be unlocked by some workers intentionally or unintentionally during construction. If there are other workers under the overturnable workpiece 2 at this time, a safety accident is caused (in the case of construction for a large workpiece, safety must be in a person's own hands, and no one else is reliable).

Figure 3A:
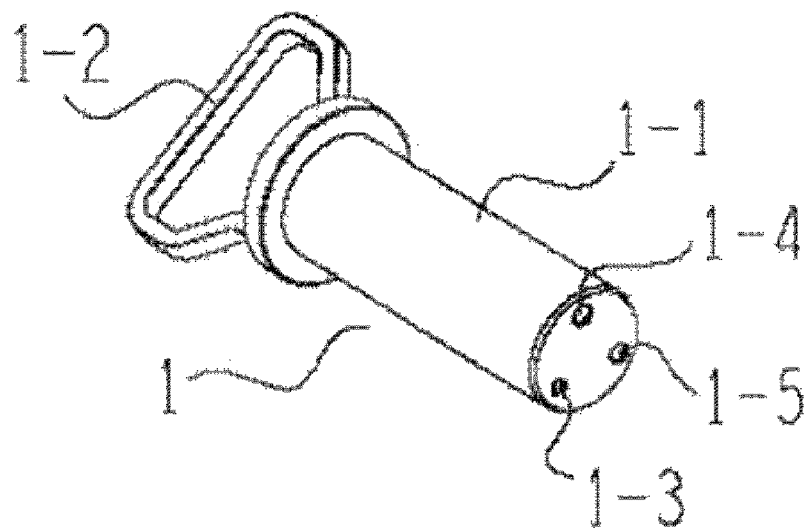
FIGS. 3A and 3B are schematic diagrams of a safety pin according to the present disclosure (FIG. 3A is a perspective view, and FIG. 3B is a front view)

As shown in FIG. 3A, the safety pin 1 includes pin shaft 1-1, handle 1-2, threaded fixing hole 1-3, positioning counterbore I 1-4, and positioning counterbore II 1-5. The positioning counterbore I 1-4 and the positioning counterbore II 1-5 are conical holes, which fit with the position pin 5 to limit the position of the triangular lock plate 2.

Figure 3B:
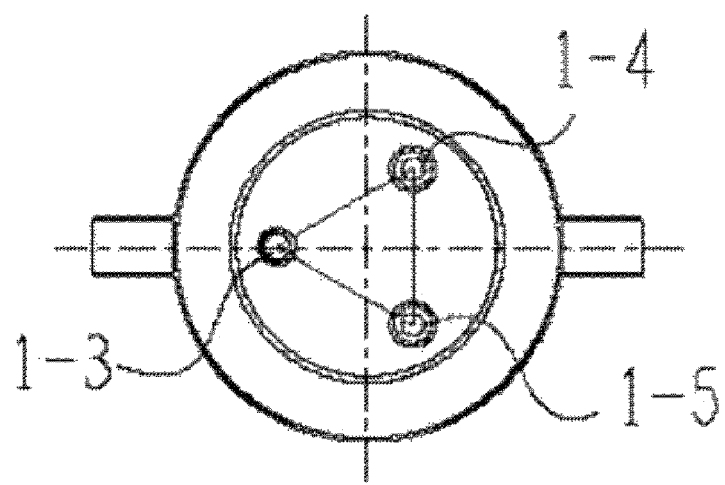

As shown in FIG. 3B, an axial surface of the pin shaft 1-1 is provided with three holes, which are threaded fixing hole 1-3, positioning counterbore I 1-4, and positioning counterbore II 1-5, lines connecting centers of the three holes form a regular triangle, and a center of the regular triangle coincides with an axis of the pin shaft.

Figure 4:
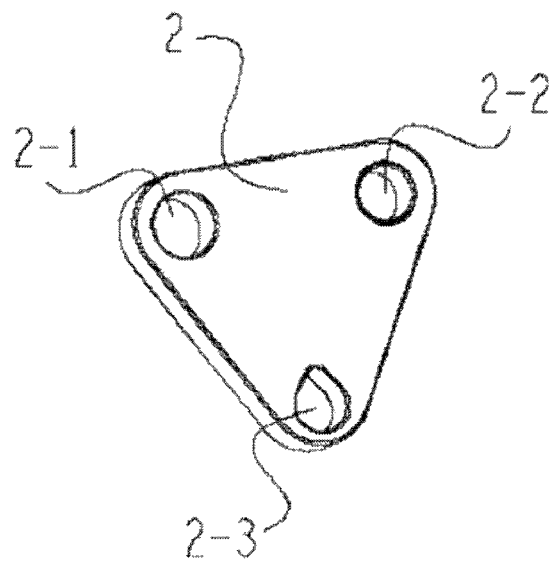
FIG. 4 is a schematic diagram of a triangular lock plate according to the present disclosure.
Figure 5:
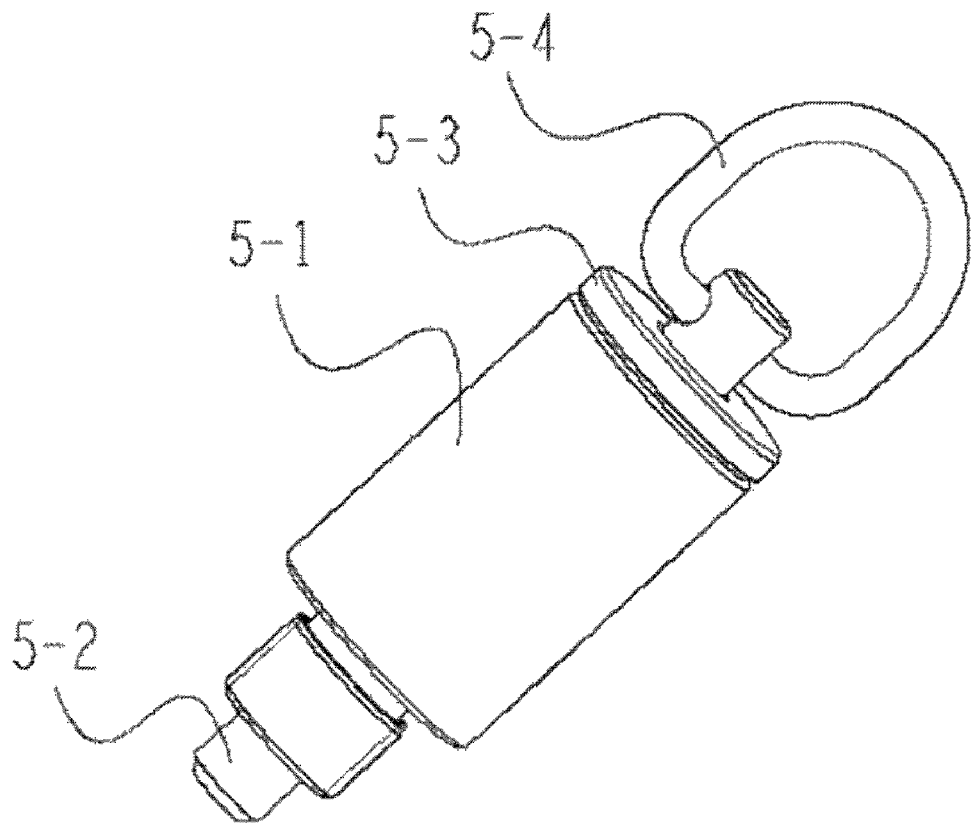
FIG. 5 is a schematic diagram of an elastic positioning pin according to the present disclosure.

As shown in FIG. 4, the triangular lock plate 2 has a regular triangular flat plate structure, with three corner ends provided with hinged through hole 2-1, internal threaded mounting hole 2-2 and keyhole 2-3, respectively, and lines connecting centers of the hinged through hole 2-1, the internal threaded mounting hole 2-2 and the keyhole 2-3 form a regular triangle, with a hole spacing consistent with a hole spacing of the three holes in the safety pin.

As shown in FIGS. 5, 6A-6B, 7 and 8, the elastic positioning pin 5 includes positioning pin housing 5-1, positioning pin body 5-2, end cover 5-3, pull ring 5-4, and return spring 5-5. External stud 5-1-1 is arranged at one end of the positioning pin housing 5-1, and is configured to be screwed into the internal threaded mounting hole 2-2 in the triangular lock plate 2. Limiting boss 5-2-1 is arranged on a middle portion of the positioning pin body 5-2, and the positioning pin body 5-2 is inserted into the positioning pin housing 5-1. The other end of the positioning pin housing 5-1 is provided with internal screw hole 5-1-2 for mounting the end cover 5-3. The return spring 5-5 is sleeved on the positioning pin body 5-2 between the limiting boss 5-2-1 and the end cover 5-3. An end of the positioning pin body 5-2 is provided with pull ring hole 5-2-2, and the pull ring 5-4 is mounted in the pull ring hole 5-2-2.

Figure 6A:
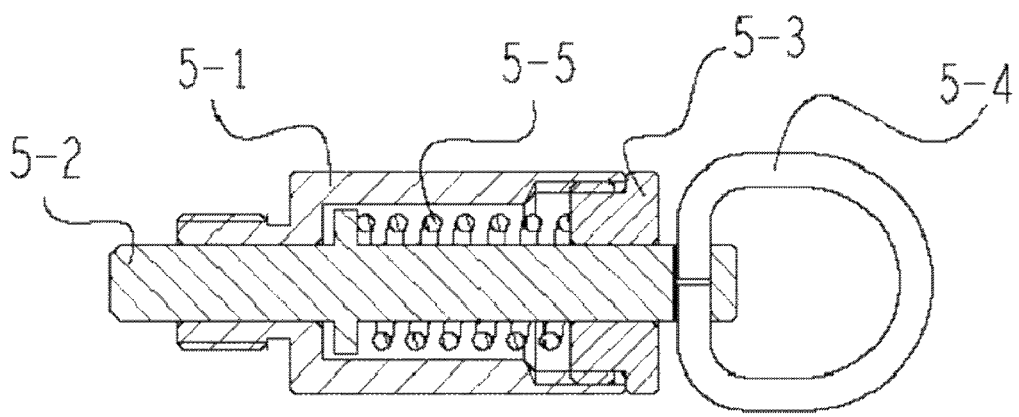
FIGS. 6A and 6B are schematic diagrams of an operating state of an elastic positioning pin according to the present disclosure (FIG. 6A is a schematic diagram showing extension-out of a positioning pin body, and FIG. 6B is a schematic diagram showing retraction of the positioning pin body)
Figure 6B:
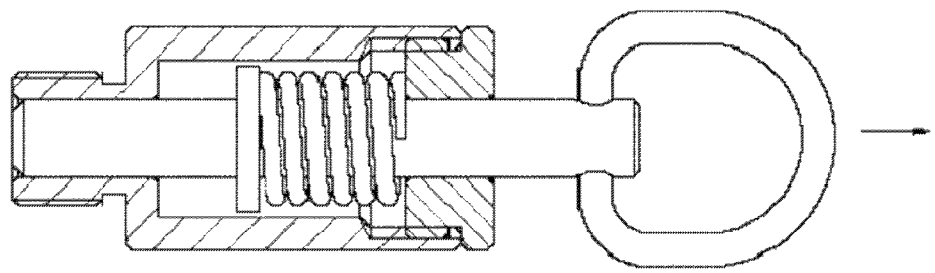
Figure 7:
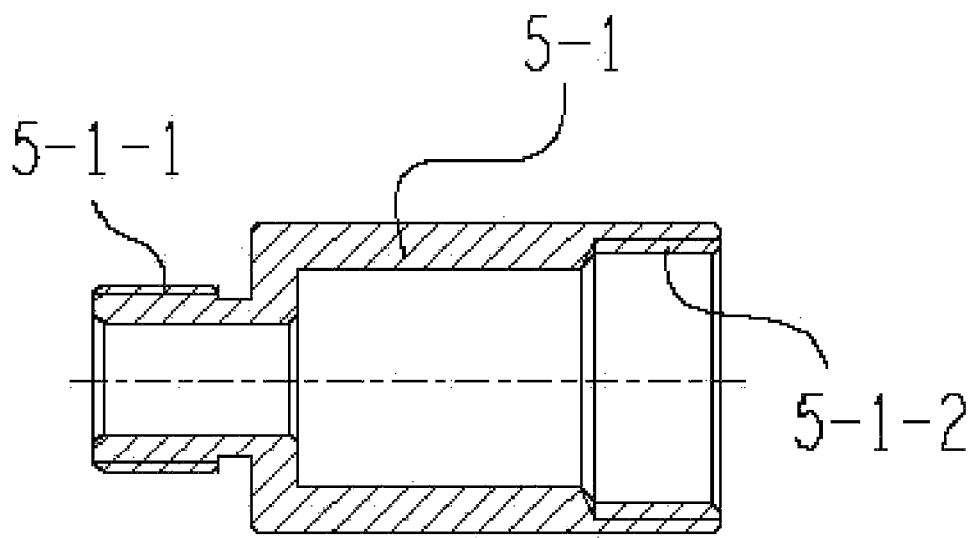
FIG. 7 is a schematic diagram of a positioning pin housing according to the present disclosure.
Figure 8:
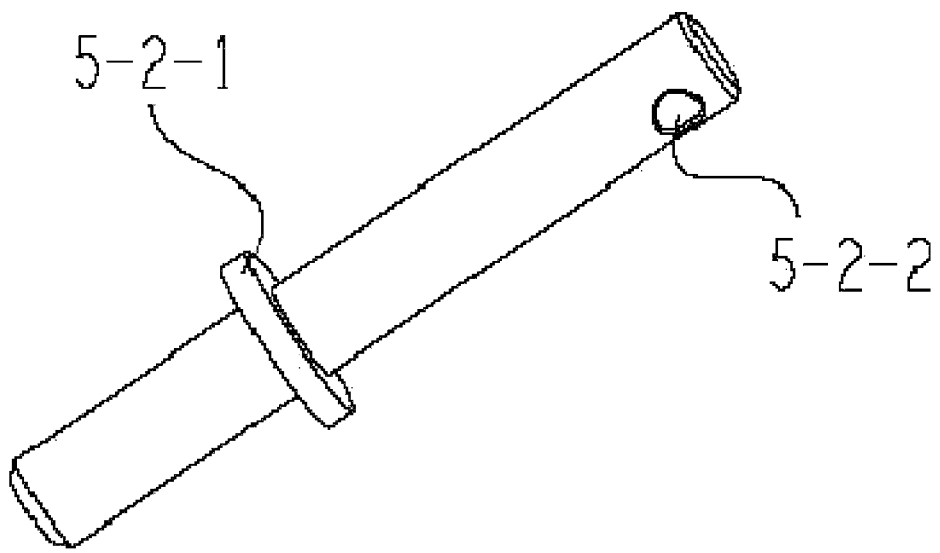
FIG. 8 is a schematic diagram of a positioning pin body according to the present disclosure.

Specifically, A process of assembling the elastic positioning pin 5 includes the following: The positioning pin body 5-2 is inserted into the positioning pin housing 5-1, the return spring 5-5 is placed in, then the end cover 5-3 is screwed into the internal screw hole 5-1-2 in the positioning pin housing 5-1, one end of the return spring 5-5 presses the limiting boss 5-2-1 on the positioning pin body 5-2, the other end thereof is pressed by the end cover 5-3, and then the pull ring 5-4 is clamped into the pull ring hole 5-2-2 in the positioning pin body 5-2. As shown in FIG. 6A, when the elastic positioning pin 5 is in a free state, one end of the positioning pin body 5-2 extends out of an end surface of one end of the external stud 5-1-1 of the positioning pin housing 5-1. As shown in FIG. 6B, when the pull ring 5-4 is pulled hard in a direction of the arrow, the positioning pin body 5-2 can be retracted into the positioning pin housing 5-1. When the pull ring 5-4 is loosened, the positioning pin body 5-2 automatically returns under the action of the return spring 5-5.

Figure 9:
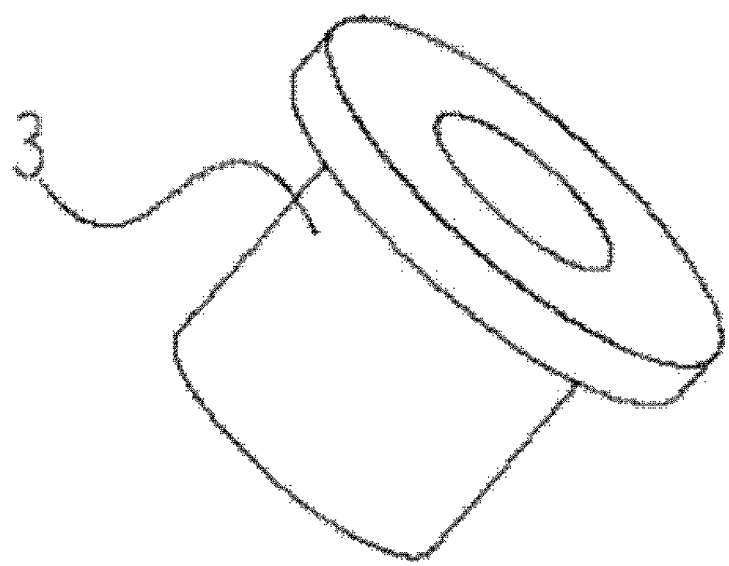
FIG. 9 is a schematic diagram of a rotating sleeve according to the present disclosure.

As shown in FIG. 9, the rotating sleeve 3 has a T-shaped structure with a central through hole. The rotating sleeve 3 and the triangular lock plate 2 are fixed to the end surface of the safety pin 1 by the fixing bolt 4, and the fixing bolt 4 is screwed into the threaded fixing hole 1-3 in the end surface of the safety pin 1.

Figure 12:
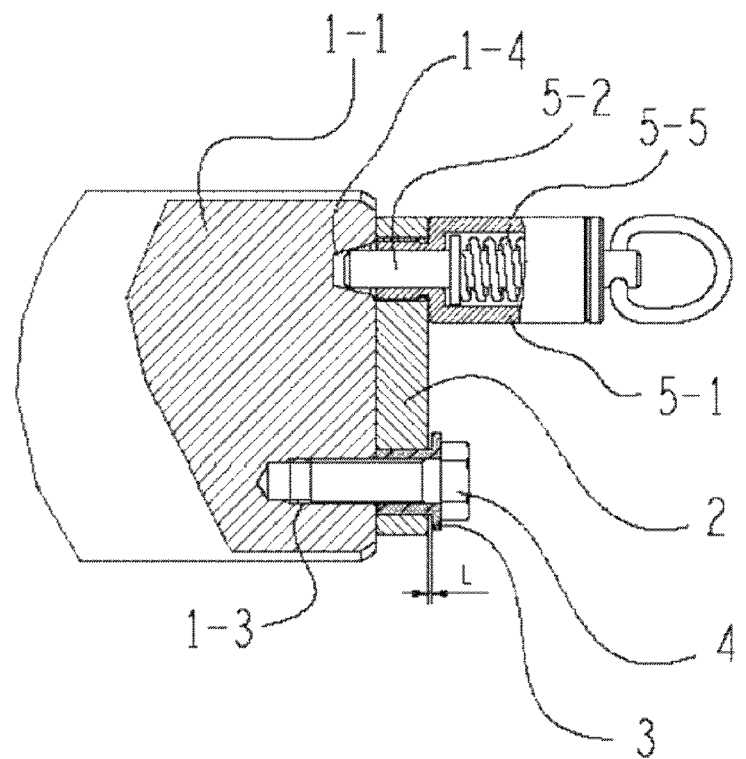
FIG. 12 is a sectional view taken along line A-A of FIG. 11A.

As shown in FIG. 12, after the rotating sleeve 3 is pressed by the fixing bolt 4, gap L is reserved between an end surface of the triangular lock plate 2 and a T-shaped stepped end surface of the rotating sleeve 3, to prevent the triangular lock plate 2 from being deadly pressed and unable to rotate. The gap L should be as small as possible, generally within 0.5 mm. A too large gap is likely to cause the triangular lock plate 2 to tilt. The triangular lock plate 2 rotates around the rotating sleeve 3, and the two positioning counterbores limit two positions of the triangular lock plate 2.

It should be noted that each of the positioning counterbore I 1-4 and the positioning counterbore II 1-5 has a conical structure, which facilitate insertion of the positioning pin body 5-2.

Figure 10:
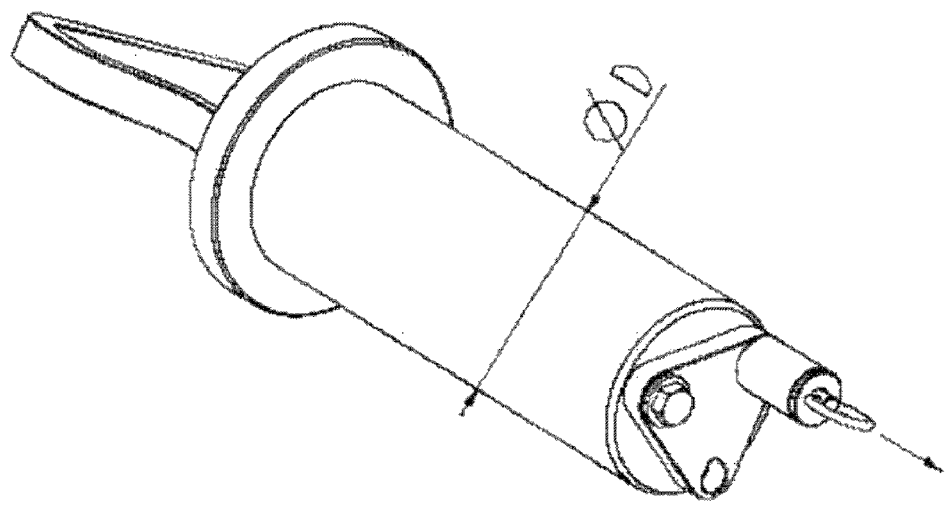
FIG. 10 is a schematic diagram showing connection of a safety pin, a triangular lock plate, and an elastic positioning pin according to the present disclosure.

When in a free state, the positioning pin body 5-2 protrudes from the positioning pin housing 5-1 and is embedded in the positioning counterbore I 1-4 or the positioning counterbore II 1-5 in the end surface of the safety pin 1-1. In this state, the triangular lock plate 2 is positioned and cannot rotate. As shown in FIG. 10, when the pull ring 5-4 is pulled hard in a direction of the arrow, the positioning pin body 5-2 is retracted into the positioning pin housing 5-1. At this time, the triangular lock plate 2 can rotate around the rotating sleeve 3.

Figure 11A:
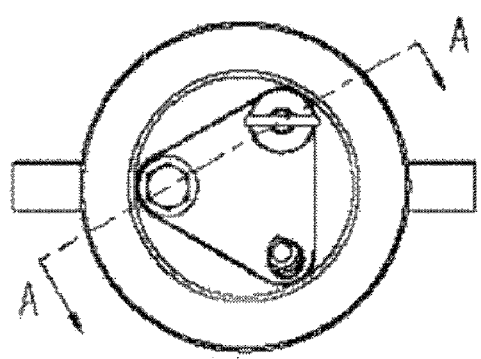
FIGS. 11A and 11B are schematic diagrams of an operating state of a safety pin, a triangular lock plate, and an elastic positioning pin according to the present disclosure.

As shown in FIG. 11A, when the positioning pin body 5-2 is embedded in the positioning counterbore I 1-4, a geometric shape of the triangular lock plate 2 is all within a diameter range φD of the safety pin, so as not to prevent the safety pin 1 from being pulled out of or inserted into the base M1 and the overturnable workpiece M2.

Figure 11B:
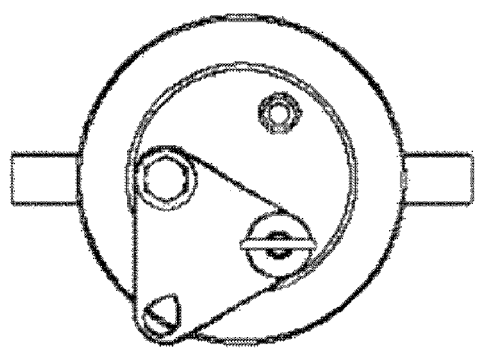

As shown in FIG. 11B, when the positioning pin body 5-2 is embedded in the positioning counterbore II 1-5, the triangular lock plate 2 is deviated from the diameter range φD of the safety pin. At this time, the safety pin 1 is not allowed to be pulled out from the base M1 or the overturnable workpiece M2. In addition, in this state, the multi-hole locking mechanism 6 shown in FIG. 2 may be mounted.

Figure 13A:
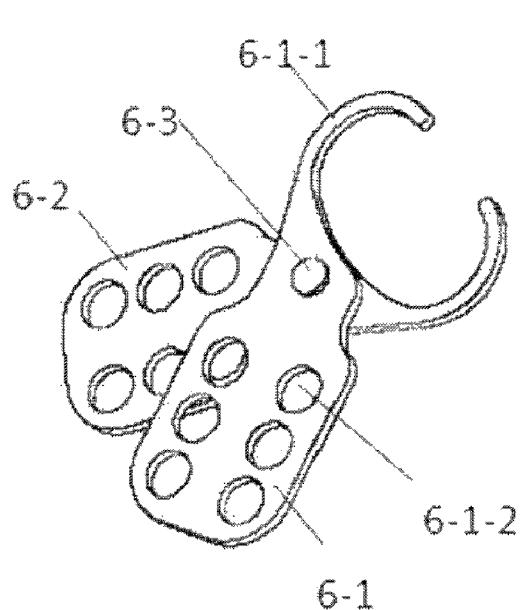
FIGS. 13A and 13B are schematic diagrams of a multi-hole locking mechanism according to the present disclosure (FIG. 13A shows an open state, and FIG. 13B shows a closed state).
Figure 13B:
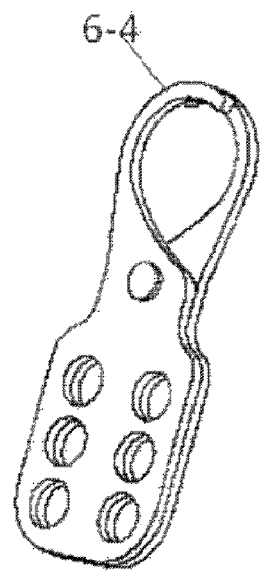

As shown in FIGS. 13A-13B, an open state and a closed state of the multi-hole locking mechanism 6 are given. The multi-hole locking mechanism 6 is formed by connecting symmetrical locking piece I 6-1 and locking piece II 6-2 together through hinged shaft 6-3, is similar to a pair of scissors, and can be opened or closed. One end of each of the locking pieces is semi-circular locking tongue 6-1-1, and the semi-circular locking tongues 6-1-1 of the two locking pieces intersect to form entire locking ring 6-4. The other end of the locking piece is provided with locking holes 6-1-2 distributed according to certain rules. When the multi-hole locking mechanism 6 is in a closed state, the locking holes 6-1-2 of the two symmetrical locking pieces coincide one to one, and the plurality of key locks 7 can be hung in the coinciding locking holes respectively. Only when all the key locks 7 are removed can the multi-hole locking mechanism 6 be opened.

To sum up, the safety pin locking device according to the present disclosure is a safety locking device with a novel structure and features simple structure, convenient operation, and high safety. By designing of the triangular lock plate and the elastic positioning pin structure, the safety pin can be mounted, locked or removed without using other tools; and the triangular lock plate is provided with the lock hole, such that the multi-hole locking mechanism can be mounted to hang the plurality of key locks, thereby greatly improving safety.

In the specification provided herein, a large quantity of specific details are described. However, it can be understood that the embodiments of the present disclosure can be practiced without these specific details. In some embodiments, well-known methods, structures and techniques are not shown in detail to avoid obscuring the understanding of this specification.

In addition, it can be understood by those skilled in the art that, although some embodiments described herein include certain features included in other embodiments, instead of other features, combinations of the features of different embodiments mean to be within the protection scope of the present disclosure and form different embodiments. For example, in the above embodiments, those skilled in the art can use the features in a combined way according to the known technical solutions and the technical problems to be solved in the present application.

The above descriptions are only preferred embodiments of the present disclosure, and are not intended to limit the present disclosure in any form. Although the present disclosure has been disclosed by the foregoing embodiments, these embodiments are not intended to limit the present disclosure. Any person skilled in the art may make some changes or modifications to implement equivalent embodiments with equivalent changes by using the technical contents disclosed above without departing from the scope of the technical solution of the present disclosure. Any simple modification and equivalent change made to the foregoing embodiments according to the technical essence of the present disclosure without departing from the content of the technical solution of the present disclosure shall fall within the scope of the technical solution of the present disclosure.

What is claimed is:

1. A safety pin locking device for workpiece turnover, comprising:
   a safety pin configured to be inserted into a base and an overturnable workpiece to lock an angle of the overturnable workpiece relative to the base;

a triangular lock plate with a first corner end connected to an axial surface of the safety pin by a fastener, wherein the triangular lock plate is rotatable around the fastener;

an elastic positioning pin mounted at a second corner end of the triangular lock plate and configured to be inserted into positioning counterbores at two different positions on the axial surface of the safety pin to limit a position of the triangular lock plate, so as to pull out the safety pin from the overturnable workpiece or prevent the safety pin from being pulled out; and a lockset mounted at a third corner end of the triangular lock plate and configured to limit rotation of the triangular lock plate, wherein the triangular lock plate is rotated by unlocking the lockset and pulling out the elastic positioning pin, wherein:

the safety pin comprises a pin shaft, wherein an axial surface of the pin shaft is provided with three holes that respectively are a threaded fixing hole, a positioning counterbore I, and a positioning counterbore II, lines connecting centers of the three holes form a regular triangle, and a center of the regular triangle coincides with an axis of the pin shaft;

the triangular lock plate has a regular triangular flat plate structure, the three corner ends are provided with a hinged through hole, an internal threaded mounting hole and a lock hole, respectively, and lines connecting centers of the hinged through hole, the internal threaded mounting hole and the lock hole form a regular triangle, with a hole spacing consistent with a hole spacing of the three holes in the safety pin;

when the elastic positioning pin is mounted in the internal threaded mounting hole and then inserted into the positioning counterbore I, a geometric shape of the triangular lock plate is all within a diameter range of the safety pin, so as not to prevent the safety pin from being pulled out of or inserted into the overturnable workpiece;

when the elastic positioning pin is mounted in the internal threaded mounting hole and then inserted into the positioning counterbore II, a corner of the triangular lock plate deviates from the diameter range of the safety pin, such that the safety pin is not allowed to be pulled out from the overturnable workpiece; and the lockset is mounted in the lock hole in the corner end deviated from the diameter range of the safety pin.

2. The safety pin locking device for workpiece turnover according to claim 1, wherein;

the fastener is a fixing bolt;

a rotating sleeve with a T-shaped structure is mounted in the hinged through hole, and the fixing bolt passes through the rotating sleeve and then is screwed into the threaded fixing hole; and after the rotating sleeve is pressed by the fixing bolt, a gap is reserved between an end surface of the triangular lock plate and a T-shaped stepped end surface of the rotating sleeve.

3. The safety pin locking device for workpiece turnover according to claim 1, wherein:

each of the positioning counterbore I and the positioning counterbore II has a conical structure.

4. The safety pin locking device for workpiece turnover according to claim 1, wherein;

the lockset is a key lock, and the key lock is hung in the lock hole of the triangular lock plate and is configured to limit rotation of the triangular lock plate.

5. The safety pin locking device for workpiece turnover according to claim 1, wherein:

the lockset comprises a multi-hole locking mechanism and a plurality of key locks;

the multi-hole locking mechanism is clamped into the lock hole of the triangular lock plate and is configured to limit rotation of the triangular lock plate; and the plurality of key locks are hung in hanging holes of the multi-hole locking mechanism respectively, and the multi-hole locking mechanism is opened only after all the hung key locks are unlocked.

6. The safety pin locking device for workpiece turnover according to claim 5, wherein;

the multi-hole locking mechanism is formed by connecting two symmetrical locking pieces together through a hinged shaft;

one end of each of the locking pieces is a semi-circular locking tongue, and the semi-circular locking tongues of the two locking pieces intersect to form a locking ring; and a plurality of locking holes are distributed at the other end of the locking tongue piece, and when the multi-hole locking mechanism is in a closed state, the locking holes of the two symmetrical locking pieces coincide one to one, and the plurality of key locks are hung in the coinciding locking holes respectively.

7. The safety pin locking device for workpiece turnover according to claim 1, wherein:

the elastic positioning pin comprises a positioning pin housing, a positioning pin body, an end cover, and a return spring;

an external stud is arranged at one end of the positioning pin housing, and is configured to be screwed into the internal threaded mounting hole in the triangular lock plate;

a limiting boss is arranged on a middle portion of the positioning pin body, and the positioning pin body is inserted into the positioning pin housing;

the other end of the positioning pin housing is provided with an internal screw hole for mounting the end cover; and the return spring is sleeved on the positioning pin body between the limiting boss and the end cover.

8. The safety pin locking device for workpiece turnover according to claim 7, wherein:

the elastic positioning pin further comprises a pull ring, wherein an end of the positioning pin body is provided with a pull ring hole, and the pull ring is mounted in the pull ring hole.

9. A workpiece turnover system, comprising a base, an overturnable workpiece, and a hinged shaft, wherein the overturnable workpiece is connected to the base by the hinged shaft, and the overturnable workpiece is rotatable around the hinged shaft, and the workpiece turnover system further comprises the safety pin locking device according to claim 1;

wherein the angle of the overturnable workpiece relative to the base is locked by the safety pin locking device.

10. The workpiece turnover system according to claim 9, wherein in the safety pin locking device, the fastener is a fixing bolt;

a rotating sleeve with a T-shaped structure is mounted in the hinged through hole, and the fixing bolt passes through the rotating sleeve and then is screwed into the threaded fixing hole; and after the rotating sleeve is pressed by the fixing bolt, a gap is reserved between an end surface of the triangular lock plate and a T-shaped stepped end surface of the rotating sleeve.

11. The workpiece turnover system according to claim 9, wherein in the safety pin locking device,
each of the positioning counterbore I and the positioning counterbore II has a conical structure.

12. The workpiece turnover system according to claim 9, wherein in the safety pin locking device,
the lockset is a key lock, and the key lock is hung in the lock hole of the triangular lock plate and is configured to limit rotation of the triangular lock plate.

13. The workpiece turnover system according to claim 9, wherein in the safety pin locking device,
the lockset comprises a multi-hole locking mechanism and a plurality of key locks;
the multi-hole locking mechanism is clamped into the lock hole of the triangular lock plate and is configured to limit rotation of the triangular lock plate; and
the plurality of key locks are hung in hanging holes of the multi-hole locking mechanism respectively, and the multi-hole locking mechanism is opened only after all the hung key locks are unlocked.

14. The workpiece turnover system according to claim 13, wherein in the safety pin locking device,
the multi-hole locking mechanism is formed by connecting two symmetrical locking pieces together through a hinged shaft;
one end of each of the locking pieces is a semi-circular locking tongue, and the semi-circular locking tongues of the two locking pieces intersect to form a locking ring; and
a plurality of locking holes are distributed at the other end of the locking tongue piece, and when the multi-hole locking mechanism is in a closed state, the locking holes of the two symmetrical locking pieces coincide one to one, and the plurality of key locks are hung in the coinciding locking holes respectively.

15. The workpiece turnover system according to claim 9, wherein in the safety pin locking device,
the elastic positioning pin comprises a positioning pin housing, a positioning pin body, an end cover, and a return spring;
an external stud is arranged at one end of the positioning pin housing, and is configured to be screwed into the internal threaded mounting hole in the triangular lock plate;
a limiting boss is arranged on a middle portion of the positioning pin body, and the positioning pin body is inserted into the positioning pin housing;
the other end of the positioning pin housing is provided with an internal screw hole for mounting the end cover; and
the return spring is sleeved on the positioning pin body between the limiting boss and the end cover.

16. The workpiece turnover system according to claim 15, wherein in the safety pin locking device,
the elastic positioning pin further comprises a pull ring, wherein an end of the positioning pin body is provided with a pull ring hole, and the pull ring is mounted in the pull ring hole.

* * * * *